(12) United States Patent
Casci et al.

(10) Patent No.: US 7,732,370 B2
(45) Date of Patent: Jun. 8, 2010

(54) CATALYSTS

(75) Inventors: John Leonello Casci, Cleveland (GB); Carl Leonard Huitson, Cleveland (GB); Cornelis Martinus Lok, Cleveland (GB)

(73) Assignee: Johnson Matthey PLC, London (GB)

( * ) Notice: Subject to any disclaimer, the term of this patent is extended or adjusted under 35 U.S.C. 154(b) by 305 days.

(21) Appl. No.: 11/579,456

(22) PCT Filed: Apr. 15, 2005

(86) PCT No.: PCT/GB2005/001468

§ 371 (c)(1), (2), (4) Date: Nov. 3, 2006

(87) PCT Pub. No.: WO2005/105299

PCT Pub. Date: Nov. 10, 2005

(65) Prior Publication Data

US 2008/0275145 A1    Nov. 6, 2008

(30) Foreign Application Priority Data

May 4, 2004    (GB) ................................. 0409901.6

(51) Int. Cl.
*B01J 23/60*    (2006.01)
*B01J 23/40*    (2006.01)
*B01J 23/75*    (2006.01)
*B01J 23/06*    (2006.01)
*B01J 21/04*    (2006.01)
*C07C 5/02*    (2006.01)
*C07C 27/06*    (2006.01)

(52) U.S. Cl. ........................ 502/329; 502/327; 585/276; 518/715

(58) Field of Classification Search ................. 502/326, 502/327, 329, 328; 518/715; 585/276
See application file for complete search history.

(56) References Cited

U.S. PATENT DOCUMENTS

| 4,039,302 | A |   | 8/1977  | Khera |
|-----------|---|---|---------|-------|
| 4,077,995 | A | * | 3/1978  | Khera ........................ 518/715 |
| 4,659,742 | A |   | 4/1987  | Courty et al. |
| 4,675,343 | A |   | 6/1987  | Courty et al. |
| 4,791,141 | A |   | 12/1988 | Chaumette et al. |
| 4,826,800 | A | * | 5/1989  | McAteer ..................... 502/303 |
| 5,109,027 | A |   | 4/1992  | Miller et al. |
| 5,140,050 | A | * | 8/1992  | Mauldin et al. ............. 518/715 |
| 7,422,995 | B2 | * | 9/2008 | Baijense et al. ............ 502/329 |

FOREIGN PATENT DOCUMENTS

EP    0 671 976 B1    8/1999
EP    1 358 934 A1    11/2003

OTHER PUBLICATIONS

Operator's Manual for the Micromeritics ASAP 201 Chemi System, V2.01, Appendix C, Part No. 01-42808-01, Oct. 1996.

* cited by examiner

*Primary Examiner*—Timothy C Vanoy
*Assistant Examiner*—Daniel Berns
(74) *Attorney, Agent, or Firm*—RatnerPrestia

(57) ABSTRACT

A catalyst including cobalt, zinc oxide and aluminium is described, having a total cobalt content of 15-75% by weight (on reduced catalyst), an aluminium content $\geq$ 10% by weight (based on ZnO) and which when reduced at 425° C., has a cobalt surface area as measured by hydrogen chemisorption at 150° C. of at least 20 m$^2$/g cobalt. A method for preparing the catalyst is also described including combining a solution of cobalt, zinc and aluminium with an alkaline solution to effect co-precipitation of a cobalt-zinc-aluminium composition from the combined solutions, separating of the co-precipitated composition form the combined solutions, heating the composition to form an oxide composition, and optionally reducing at least a portion of the cobalt to cobalt metal. The catalysts may be used for hydrogenation reactions and for the Fischer-Tropsch synthesis of hydrocarbons.

22 Claims, No Drawings

CATALYSTS

This application is the U.S. National Phase application of PCT International Application No. PCT/GB2005/001468, filed Apr. 15, 2005, and claims priority of British Patent Application No. 0409901.6, filed May 4, 2004.

FIELD OF THE INVENTION

This invention relates to cobalt catalysts and in particular to cobalt catalysts comprising cobalt, zinc and aluminium.

BACKGROUND OF THE INVENTION

Supported cobalt catalysts wherein the cobalt is in its elemental or reduced state are well known and find use in many reactions involving hydrogen such as hydrogenation reactions, e.g. nitrile hydrogenation reactions and the Fischer-Tropsch synthesis of hydrocarbons. The activity of the catalysts is believed to be directly proportional to the cobalt surface area of the reduced catalysts, but in order to achieve high cobalt surface areas, the cobalt should be well dispersed on the support. As the cobalt content of a catalyst increases above 15%, particularly above 20% by weight (on reduced catalyst) the cobalt becomes more difficult to disperse resulting in lower cobalt surface areas per gram cobalt. Cobalt is a relatively expensive metal and therefore there is a desire to improve the cobalt dispersion. (expressed as cobalt surface area per gram cobalt) for supported cobalt catalysts.

Cobalt catalysts comprising cobalt on zinc oxide/aluminium compositions are known. EP-B1-0671976 describes cobalt/zinc oxide catalysts wherein the zinc oxide contains a group IIIa metal such as aluminium at 0.5-7.5% preferably 0.8-2% by weight (as metal on weight of zinc oxide). The low levels of aluminium, present in the composition in the form of a spinel (i.e. $ZnAl_2O_4$), were apparently included to increase the compression strength or reduce shrinkage and sintering. Whereas the cobalt content of the Co/Zn/Al catalysts is given as 3-40% wt (Co metal on total weight of composition), only 10% wt was exemplified and no indication of the cobalt surface area was given. Furthermore, the catalyst preparation method exemplified required firstly co-precipitating the zinc oxide composition, filtering, washing, drying and calcining it, then slurrying the calcined composition with cobalt nitrate solution, drying the slurry, grinding and re-calcining. The multiple heating steps in this method make it unattractive for large scale catalyst manufacture. Consequently a method whereby a Co/Zn/Al catalyst is formed in fewer steps, in particular without the need for two-calcination steps is desirable.

EP-A-1358934 describes particulate cobalt-zinc co-precipitated catalysts having a volume average particle size of less than 150 μm and their use for the Fischer-Tropsch synthesis of hydrocarbons. Whereas it is stated that a group IIIa element such as aluminium, may be present in a concentration of 0.1-10% wt (on catalyst) to effect structural stability, no specific disclosure of aluminium-containing catalysts is made, nor is any data provided on the cobalt surface areas of the resulting catalysts.

SUMMARY OF INVENTION

We have found that the methods described heretofore do not provide the desired high cobalt dispersions and hence high cobalt surface areas per gram cobalt. We have found that the incorporation of aluminium at levels $\geq 10\%$ wt (based on ZnO) in cobalt-zinc oxide catalysts having a cobalt content in the range 15-75% wt has a beneficial effect on the cobalt dispersion and resulting cobalt surface area.

Accordingly, the present invention provides a catalyst comprising cobalt, zinc oxide and aluminium having a total cobalt content of 15-75% by weight (on reduced catalyst), an aluminium content $\geq 10\%$ by weight (based on ZnO) and which when reduced at 425° C., has a cobalt surface area as measured by hydrogen chemisorption at 150° C. of at least 20 $m^2/g$ of cobalt.

The invention further provides method for preparing the above catalyst comprising cobalt, zinc oxide and aluminium wherein the cobalt content of the catalyst is 15-75% by weight (on reduced catalyst), by (i) combining a solution of cobalt, zinc and aluminium with an alkaline solution to effect co-precipitation of a cobalt-zinc-aluminium composition from the combined solutions, (ii) separating of the co-precipitated composition from the combined solutions, (iii) heating the composition to form an oxidic composition, and optionally (iv) reducing at least a portion of the cobalt to cobalt metal wherein the acidic solutions are combined in amounts such that aluminium content of the oxidic composition is $\geq 10\%$ by weight (based on ZnO), and which when reduced at 425° C., has a cobalt surface area as measured by hydrogen chemisorption at 150° C. of at least 20 $m^2/g$ of cobalt.

The invention also provides the use of the catalysts for hydrogenation reactions and for the Fischer-Tropsch synthesis of hydrocarbons.

DETAILED DESCRIPTION OF THE INVENTION

The catalyst comprises cobalt species intimately mixed with aluminium-containing zinc oxide in which the aluminium may be in the form of alumina and/or $ZnAl_2O_4$. The term "cobalt species" is used broadly to include both elemental cobalt and cobalt in combined form, e.g. as compounds such as cobalt oxides and cobalt hydroxycarbonates. The catalyst in its reduced form is useful for catalysing hydrogenation reactions and the Fischer-Tropsch synthesis of hydrocarbons. The catalyst may, however, be provided as an unreduced precursor wherein the cobalt is present as one or more compounds, such as oxides or hydroxycarbonates, reducible to elemental cobalt. The reduction of the cobalt may then be performed by the user in-situ. The cobalt surface area figures used herein, unless otherwise stated, apply to the material after reduction, but the invention is not limited to the provision of reduced catalyst.

Zinc oxide is a useful alternative catalyst support. For example, it may offer improvements with regard to the physical properties or reducibility of the resulting cobalt species compared to other catalyst supports. Furthermore zinc oxide is able to act as a catalyst poison 'sink' e.g. for any sulphur compounds which may be present in the process gas streams. Protecting the catalyst from sulphur poisoning can extend the useful life of the catalyst.

The cobalt content of the catalysts is in the range 15-75%, preferably 220% by weight (on reduced catalyst). For hydrogenation or Fischer-Tropsch catalysts, it is desirable to provide cobalt levels $\geq 15\%$, particularly $\geq 20\%$ by weight of cobalt to reduce the volume of catalyst and hence the size of process equipment. Furthermore, where the catalyst support is able to form cobalt compounds that are difficult to reduce, e.g. cobalt spinels, by providing higher levels of cobalt, the negative effect of spinel formation is reduced because more of the cobalt is available for subsequent reduction.

The catalysts comprise aluminium in the form of alumina and/or $ZnAl_2O_4$. The presence of any $ZnAl_2O_4$ may be determined by X-ray diffraction. Preferably the aluminium is predominantly present as alumina ($Al_2O_3$). The aluminium content of the catalyst is $\geqq 10\%$, preferably >20%, especially >25%, by weight (based on ZnO). Preferably the aluminium content of the catalyst is $\leqq 66\%$, more preferably $\leqq 33\%$ by weight (based on ZnO).

The catalyst may also contain other components that improve the catalyst physical properties or its susceptibility to reduction. For example, the catalyst may contain one or more promoters such as magnesia, ceria, lanthana, titania, zirconia, hafnia, ruthenium, platinum, palladium or rhenium or a combination thereof. Preferably the catalyst, when formulated for the Fischer-Tropsch synthesis of hydrocarbons, comprises one or more promoters selected from the above list. In one preferred embodiment the catalyst comprises cobalt, zinc, alumina and magnesia.

Catalysts of the present invention may be prepared by co-precipitating a cobalt-zinc-aluminium composition. This is may be accomplished by addition of an aqueous alkaline solution to a stirred, combined solution of cobalt, zinc and aluminium or by adding the combined cobalt/zinc/aluminium solution to the stirred alkaline solution, but is preferably accomplished by combining the Co/Zn/Al and alkaline solutions simultaneously to a stirred precipitation reactor, which may contain an aqueous medium, e.g. water. The Co/Zn/Al solution may be prepared by dissolving cobalt, zinc and aluminium separately or together in acid solution, e.g. nitric or acetic acid or by dissolving suitable soluble cobalt, zinc and aluminium compounds in water or dilute acid. Preferred soluble cobalt and zinc compounds are the acetates and nitrates, particularly the nitrates. Suitable soluble aluminium compounds are sodium aluminate and aluminium nitrate. Preferably the pH of the solutions is adjusted if necessary to prevent premature precipitation.

The alkaline solution may be a solution of an organic base and/or an inorganic base. Organic bases include tetraalkyl ammonium hydroxides, amines, pyridine or alkanolamines. Inorganic bases include aqueous ammonia, ammonium carbonate, ammonium bicarbonate and/or a group I or group II metal hydroxide, bicarbonate or carbonate such as sodium hydroxide, sodium carbonate, sodium bicarbonate, potassium hydroxide or potassium carbonate. Inorganic bases are preferred. The concentration of the various components is typically in the range 0.1 to 5 moles/liter and may be selected appropriately to suit the equipment and scale of operation using knowledge known to those skilled in the art.

Where promoters are present in the catalyst, these may be included by addition of suitable precursor compounds such as metal salts, e.g. metal nitrates or metal acetates, or suitable metal-organic compounds, such as metal alkoxides or metal acetylacetonates, to the combined solution before or during the co-precipitation.

The shift in pH on combining the Co/Zn/Al and alkaline solutions causes a cobalt-zinc-aluminium composition to precipitate from the combined solution. The pH of the Co/Zn/Al solution is preferably in the range 1-5 and the pH of the alkaline solution is preferably in the range 7-14. Where co-precipitation is effected by simultaneous addition of the Co/Zn/Al and alkaline solutions to an aqueous medium, the pH of said medium is preferably in the range 4-9. The pH at which precipitation occurs will vary with the exact composition, but is preferably >5, particularly 6.5-7.5. It is preferred that the pH during precipitation is maintained at a constant value (±0.2 pH units) by controlling the addition of the Co/Zn/Al and alkaline solutions to the precipitation reactor. Furthermore and the speed of stirring and the temperature at which the precipitation is performed may be increased or reduced during precipitation influence the properties of the resulting catalyst. Preferably the co-precipitation is performed at a temperature between 15 and 100° C., preferably >50° C.

In a preferred embodiment, alumina and/or preferably a hydrous alumina, especially alumina trihydrate, is added to the combined solution before, but preferably during, the co-precipitation. Providing aluminium in this way allows variation in the catalyst properties.

The pore volume of the reduced catalyst of the present invention is preferably >0.5 ml/g catalyst.

The resulting co-precipitated composition is separated from the combined solutions, typically by filtration or centrifugation to yield a damp product, which is preferably washed with water to remove traces of soluble salts. The separated composition is then subjected to heating to form an oxidic composition. The heating step is generally accomplished by drying and calcining the composition. This may be performed in one or two stages. Drying is typically performed at 60-130° C. Calcination may be performed at 250-600° C. or higher for up to 24 hours, but is preferably performed at 250-450° C. over 1-10 hours. The resulting oxidic composition comprises an intimate mixture of cobalt, zinc and aluminium oxides, possibly with residual carbonate species, in which the aluminium is present in an amount $\geqq 10\%$ by weight (based on ZnO). To render the catalyst catalytically active for Fischer-Tropsch or hydrogenation reactions, at least a portion of the cobalt is preferably reduced to cobalt metal. Reduction may be performed using hydrogen-containing gasses at elevated temperature.

Before the reduction step, the oxidic composition may, if desired, be formed into shaped units suitable for the process for which the catalyst is intended, using methods known to those skilled in the art. The shaped units may be spheres, pellets, cylinders, rings, or multi-holed pellets, which may be multi-lobed or fluted, e.g. of cloverleaf cross-section.

The oxidic composition may be reduced to provide cobalt in the elemental state. Reduction may be performed by passing a hydrogen-containing gas such as hydrogen, synthesis gas or a mixture of hydrogen with nitrogen or other inert gas over the oxidic composition at elevated temperature, for example by passing the hydrogen-containing gas over the composition at temperatures in the range 150-500° C. for between 1 and 16 hours, preferably 300-500° C. Catalysts in the reduced state can be difficult to handle as they can react spontaneously with oxygen in air, which can lead to undesirable self-heating and loss of activity. Consequently reduced catalysts suitable for hydrogenation reactions are preferably passivated following reduction with an oxygen-containing gas, often air or oxygen in carbon dioxide and/or nitrogen. Passivation provides a thin protective layer sufficient to prevent undesirable reaction with air, but which is readily removed once the catalyst has been installed in a hydrogenation process by treatment with a hydrogen-containing gas. For catalysts suitable for Fischer-Tropsch processes, passivation is not preferred and the reduced catalyst is preferably protected by encapsulation of the reduced catalyst particles with a suitable barrier coating. In the case of a Fischer-Tropsch catalyst, this may suitably be a FT-hydrocarbon wax. Alternatively, the catalyst can be provided in the oxidic unreduced state and reduced in-situ with a hydrogen-containing gas. Whichever route is chosen, the catalysts of the present invention provide high cobalt surface areas per gram cobalt.

The catalysts, when reduced at 425° C., have a cobalt surface area of at least 20 m²/g of cobalt as measured by the $H_2$ chemisorption technique described herein. Preferably the cobalt surface area is greater than 30 m²/g, more preferably at least 40 m²/g. Preferably, in order to achieve a suitable catalyst volume in hydrogenation and or Fischer-Tropsch processes, the catalysts will have a cobalt surface area/g catalyst >10 m²/g catalyst, more preferably >15 m²/g catalyst.

The cobalt surface area is determined by $H_2$ chemisorption. The preferred method is as follows: approximately 0.2 to 0.5 g of sample material is firstly degassed and dried by heating to 140° C. at 10° C./min in flowing helium and holding it at 140° C. for 60 mins. The degassed and dried sample is then reduced by heating it from 140° C. to 425° C. at a rate of 3° C./min under a 50 ml/min flow of hydrogen and then holding it under the same hydrogen flow, at 425° C. for 6 hours. Following reduction and under vacuum, the sample is heated up to 450° C. at 10° C./min and held under these conditions for 2 hours. The sample is then cooled to 150° C. and held for a further 30 minutes under vacuum. The chemisorption, analysis is carried out at 150° C. using pure hydrogen gas. An automatic analysis program is used to measure a full isotherm over the range 100 mmHg up to 760 mmHg pressure of hydrogen. The analysis is carried out twice; the first measures the "total" hydrogen uptake (i.e. includes chemisorbed hydrogen and physisorbed hydrogen) and immediately following the first analysis the sample is put under vacuum (<5 mm Hg) for 30 mins. The analysis is then repeated to measure the physisorbed uptake. A linear regression may then be applied to the "total" uptake data with extrapolation back to zero pressure to calculate the volume of gas chemisorbed (V).

Cobalt surface areas were calculated in all cases using the following equation;

$$\text{Co surface area} = (6.023 \times 10^{23} \times V \times SF \times A)/22414$$

where V=uptake of $H_2$ in ml/g

SF=Stoichiometry factor (assumed 2 for $H_2$ chemisorption on Co)

A=area occupied by one atom of cobalt (assumed 0.0662 nm²)

This equation is described in the Operators Manual for the Micromeretics ASAP 2010 Chemi System V 2.01, Appendix C, Part No. 201-42808-01, October 1996.

The catalysts of the present invention may be used for hydrogenation reactions and for the Fischer-Tropsch synthesis of hydrocarbons.

Typical hydrogenation reactions include the hydrogenation of aldehydes and nitriles to alcohols and amines respectively, and the hydrogenation of cyclic aromatic compounds or unsaturated hydrocarbons. Such hydrogenation reactions are typically performed in a continuous or batch-wise manner by treating the compound to be hydrogenated with a hydrogen-containing gas under pressure in an autoclave at ambient or elevated temperature in the presence of the cobalt-catalyst.

The Fischer-Tropsch synthesis of hydrocarbons is well established. The Fischer-Tropsch synthesis converts a mixture of carbon monoxide and hydrogen to hydrocarbons. The mixture of carbon monoxide and hydrogen is typically a synthesis gas having a hydrogen:carbon monoxide ratio in the range 1.7-2.5:1. The reaction may be performed in a continuous or batch process using one or more stirred slurry-phase reactors, bubble-column reactors, loop reactors or fluidised bed reactors. The process may be operated at pressures in the range 0.1-10 Mpa and temperatures in the range 150-350° C. The gas-hourly-space velocity (GHSV) for continuous operation is in the range 100-25000 hr$^{-1}$. The catalysts of the present invention are of particular utility because of their high cobalt surface areas/g cobalt.

EXAMPLES

The invention will now be further described by reference to the following examples.

Example 1

Preparation of Catalysts

A Co/Zn/Al solution was prepared by dissolving sodium aluminate (52.5 g) in 1 liter of cold demineralised water. To this was added 250 ml of nitric acid with stirring. Cobalt nitrate nonahydrate (1281 g) and zinc nitrate hexahydrate (729.4 g) were then dissolved in hot demineralised water and added to the sodium aluminate solution with stirring. This solution was then made up to a final volume of 3.7 liters with demineralised water. A 1.5 molar sodium carbonate solution in water (4.2 liters) was separately prepared.

(a) 2.2 liters of the Co/Zn/Al solution and the sodium carbonate solution were heated to 80-85° C. and pumped simultaneously to a stirred precipitation reactor. The rate of addition was controlled so that the pH in the combined solution was pH 6.8. Slurried alumina trihydrate (60 g in 300 ml water) was added during the co-precipitation to the stirred reaction mixture. Once the additions were completed, the cobalt-zinc-aluminium composition was recovered by filtration and washed with hot demineralised water to remove traces of sodium. The filtrate was colourless indicating complete precipitation of the cobalt. The filter cake was then dried at 120° C. for 16 h, followed by calcination at 300° C. for 6 h.

(b) The above method was repeated using the remaining 1.5 liters of the Co/Zn/Al solution but increasing the alumina trihydrate addition to 128.1 g in 600 ml water.

The compositions of the un-reduced catalysts were as follows;

| Wt % | Example 1a | Example 1b |
|---|---|---|
| Co | 35.4 | 37.5 |
| Zn | 21.7 | 22.7 |
| Al | 3.2 | 6.7 |
| % Al on ZnO | 11.8 | 23.6 |

The materials were subjected to reduction at 425° C. and cobalt surface area analysis using the method described above. In addition, using nitrogen physisorption, the BET surface area, pore volume and pore diameter were measured on the oxidic composition and on the reduced catalyst. The analytical results are as follows:

| Example | WLOR (% w/w) | Co in reduced form (Wt %) | Co Surface Area (m²/g catalyst) | Co Surface Area (m²/g Co) |
|---|---|---|---|---|
| 1a | 25 | 48.3 | 18.1 | 37.5 |
| 1b | 22 | 42.4 | 22.7 | 53.6 |

| Example | BET Surface area (m²/g) | Pore Volume (ml/g) | Average Pore Diameter (Å) |
|---|---|---|---|
| 1a Oxidic Composition | 173.8 | 0.67 | 160 |
| 1a Reduced Catalyst | 103.2 | 0.58 | 230 |
| 1b Oxidic Composition | 168.3 | 0.57 | 143 |
| 1b Reduced Catalyst | 122 | 0.57 | 196 |

Example 2

Preparation of Catalysts

Example 1 was repeated except that no alumina trihydrate slurry was fed to the co-precipitation reactor. The co-precipitation was carried out by simultaneously adding 1.5 molar sodium carbonate solution (3 liters) and an aqueous solution containing 709.5 g Co nitrate hexahydrate, 294.2 g Zn nitrate nonahydrate, 227.6 g Al nitrate nonahydrate and 38.2 g Mg nitrate hexahydrate in 4180 ml demineralised water to the co-precipitation reactor. Each stream was controlled so that the pH of the combined solution was 6.9 and the temperature was 65° C. After precipitation the composition was again recovered by filtration and washed with hot demineralised water to remove traces of sodium, then dried at 105° C. for 16 hrs and calcined at 300° C. for 6 hours. The composition of the un-reduced catalyst was as follows:

| % Wt | Example 2 |
|---|---|
| Co | 42.2 |
| Zn | 15.2 |
| Al | 4.1 |
| Mg | 0.2 |
| % Al on ZnO | 21.9 |

The catalyst was reduced at 425° C. and subjected to cobalt surface area analysis as described above. The oxidic composition and the reduced catalyst were also analysed for BET surface area and pore size/volume using nitrogen absorption. The results are as follows:

| Example | WLOR (% w/w) | Co Surface Area (m²/g cat) | Co Surface Area (m²/g Co) |
|---|---|---|---|
| 2 | 21 | 26.4 | 49.5 |

Again the Co surface area/g cobalt is >20 m²/g cobalt.

| Example | BET Surface area (m²/g) | Pore Volume (ml/g) | Average Pore Diameter (Å) |
|---|---|---|---|
| 2 Oxidic Composition | 165 | 0.42 | 103 |
| 2 Reduced Catalyst | 129 | 0.65 | 204 |

Example 3

Catalyst Testing

The catalysts were pre-reduced using hydrogen at or above 3000 hr$^{-1}$ GHSV at a temperature of 425° C. for 4 hours. Catalysts were tested for the Fischer-Tropsch synthesis of hydrocarbons in a 1-liter CSTR at a hydrogen to carbon monoxide ratio of 2:1 at a temperature of 210° C. and pressure of 20 bar abs. 3-5 g of pre-reduced catalyst was dispersed in a hydrocarbon wax of average molecular weight 3000 (Polywax 3000) and the gases introduced under pressure. The space velocity of the gases was adjusted to give ca 50% CO conversion and measurements taken at 190-200 hrs of activity, based on the normalised space velocity required for 50% CO conversion per gram catalyst, and selectivity for C5+ hydrocarbons. The results are follows;

| Example | Space velocity for 50% CO conversion per gram catalyst (nl/hr · g) | C5+ selectivity % |
|---|---|---|
| 1b | 4.63 | 79.28 |
| 2 | 1.53 | 75.58 |

Thus the catalysts of the present invention are both active and selective. Example 2 containing magnesium had a lower activity that the Mg-free catalyst.

Comparative Example C1

Omission of Aluminium

Cobalt-zinc compositions containing 25 and 45% wt Co (as oxides) were prepared according to the method of example 2 but without any aluminium compounds. The co-precipitates were aged for 6 hours at temperatures of 30 or 60° C. before filtration and washing. The samples were calcined at 250° C. for 4 hours and the calcined oxidic materials reduced at 425° C. and their cobalt surface areas determined using the method described above. The results are as follows:

| Ageing | | | | | | |
|---|---|---|---|---|---|---|
| Temp. (° C.) | Time (h) | % wt Co Oxidic | % wt Co Reduced | WLOR (%) | Co Surface Area m²/g catalyst | Co Surface Area m²/g cobalt |
| 30 | 6 | 25.0 | 35.7 | 30 | 4.5 | 12.6 |
| 60 | 6 | 25.0 | 36.2 | 31 | 3.6 | 9.9 |
| 30 | 6 | 45.0 | 72.6 | 38 | 1.0 | 1.4 |
| 60 | 6 | 45.0 | 73.8 | 39 | 1.5 | 2.0 |

These results show that in the absence of aluminium, very low cobalt surface areas per gram catalyst or per gram cobalt are obtained.

Comparative Example C2

ZnO/Al supports were prepared according to the methods described in Examples (a) and (b) of EP-0671976-B1. Cobalt nitrate was impregnated onto these supports according to the method of Example (e) of the same patent. The compositions of the un-reduced catalysts obtained were as follows:

| Wt % | Example C2a | Example C2b |
|---|---|---|
| Co | 7.61 | 7.84 |
| Zn | 65.36 | 64.62 |
| Al | 0.39 | 0.83 |
| % Al on ZnO | 0.48 | 1.03 |

The catalysts were reduced at 425° C. and the cobalt surface areas determined using the above method. The cobalt surface areas were as follows:

| | Example C2a | Example C2b |
|---|---|---|
| Co Surface area (m$^2$/g Catalyst) | 1.8 | 3.0 |

These catalysts have a very low cobalt surface area/g catalyst.

Catalysts with such low surface areas would be expected to show low activity for hydrogenation and Fischer Tropsch reactions.

The invention claimed is:

1. An unreduced catalyst consisting of cobalt species, zinc oxide, and aluminium, and optionally one or more promoters selected from the group consisting of magnesia, ceria, lanthana, titania, zirconia, hafnia, ruthenium, platinum, palladium, rhenium, and a combination thereof, wherein the cobalt species are intimately mixed with aluminium containing zinc oxide in which the aluminium is in the form of at least one of alumina or $ZnAl_2O_4$, the aluminium is present in an amount of about 10-66% by weight (based on ZnO) and the cobalt species are present in an amount such that when the catalyst precursor is reduced to form a reduced catalyst the cobalt content is about 15-75% based on the reduced catalyst, and when the catalyst precursor is reduced at 425° C., the reduced catalyst has a cobalt surface area as measured by hydrogen chemisorption at 150° C. of at least 20 m$^2$/g of cobalt.

2. A catalyst according to claim 1 wherein the cobalt content is ≧20% by weight (on reduced catalyst).

3. A catalyst according to claim 1 wherein the cobalt surface area following reduction at 425° C. is >40 m$^2$/g of cobalt.

4. A catalyst according to claim 1 wherein the pore volume of the reduced catalyst is >0.5 ml/g catalyst.

5. A method for preparing a catalyst according to claim 1 comprising the steps of:
   (i) combining a solution of cobalt, zinc and aluminium with an alkaline solution to effect co-precipitation of a cobalt-zinc-aluminium composition from the combined solutions,
   (ii) separating the co-precipitated composition from the combined solutions, and
   (iii) heating the composition to form an oxidic composition.

6. A method according to claim 5 wherein the cobalt, zinc and aluminium solution and alkaline solution are added simultaneously to a stirred vessel.

7. A method according to claim 5 wherein particulate alumina or hydrous alumina is added to the combined solution during the co-precipitation step.

8. A process for hydrogenating a compound comprising treating the compound with a hydrogen-containing gas under pressure in an autoclave at ambient or elevated temperature in the presence of the catalyst according to claim 1

9. A process for the Fischer-Tropsch synthesis of hydrocarbons comprising converting a mixture of carbon monoxide and hydrogen into hydrocarbons in the presence of a catalyst according to claim 1.

10. A method according to claim 5 further comprising the step of:
    (iv) reducing at least a portion of the cobalt to cobalt metal.

11. A reduced catalyst consisting of cobalt species, zinc oxide, and aluminium, wherein at least a portion of the cobalt species is elemental cobalt and the cobalt species are intimately mixed with aluminium containing zinc oxide in which the aluminium is in the form of at least one of alumina or $ZnAl_2O_4$, and optionally one or more promoters selected from the group consisting of magnesia, ceria, lanthana, titania, zirconia, hafnia, ruthenium, platinum, palladium, rhenium, and a combination thereof, the aluminium is present in an amount in the range of 10-66% by weight (based on ZnO) and the cobalt is present in an amount of 15-75% based on the reduced catalyst, and when reduced at 425° C., the reduced catalyst has a cobalt surface area as measured by hydrogen chemisorption at 150° C. of at least 20 m$^2$/g of cobalt.

12. A catalyst according to claim 11 wherein the cobalt content is ≧20% by weight (on reduced catalyst).

13. A catalyst according to claim 11 wherein the cobalt surface area following reduction at 425° C. is >40 m$^2$/g of cobalt.

14. A catalyst according to claim 11 wherein the pore volume of the reduced catalyst is >0.5 ml/g catalyst.

15. A method for preparing a catalyst according to claim 11 comprising the steps of:
    (i) combining a solution of cobalt, zinc and aluminium with an alkaline solution to effect co-precipitation of a cobalt-zinc-aluminium composition from the combined solutions,
    (ii) separating the co-precipitated composition from the combined solutions, and
    (iii) heating the composition to form an oxidic composition.

16. A method according to claim 15 further comprising the step of:
    (iv) reducing at least a portion of the cobalt to cobalt metal.

17. A method according to claim 15 wherein the cobalt, zinc and aluminium solution and alkaline solution are added simultaneously to a stirred vessel.

18. A method according to claim 15 wherein particulate alumina or hydrous alumina is added to the combined solution during the co-precipitation step.

19. A process for hydrogenating a compound comprising treating the compound with a hydrogen-containing gas under pressure in an autoclave at ambient or elevated temperature in the presence of the catalyst according to claim 11.

20. A process for the Fischer-Tropsch synthesis of hydrocarbons comprising converting a mixture of carbon monoxide and hydrogen into hydrocarbons in the presence of a catalyst according to claim 11.

21. A catalyst according to claim 1, wherein the catalyst consists of the cobalt species, the zinc oxide, the aluminium, and the one or more promoters.

22. A catalyst according to claim 11 wherein the catalyst consists of the cobalt species, the zinc oxide, the aluminium, and the one or more promoters.

* * * * *